H. S. CHAPIN.
GRAIN SPROUTING DEVICE.
APPLICATION FILED APR. 5, 1912.
1,046,971.
Patented Dec. 10, 1912.
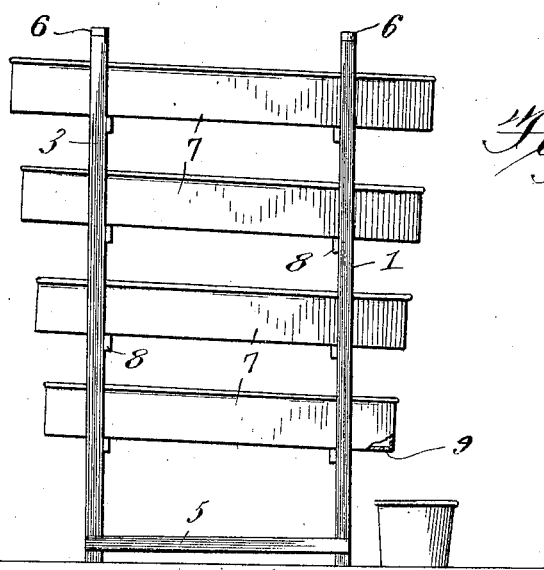
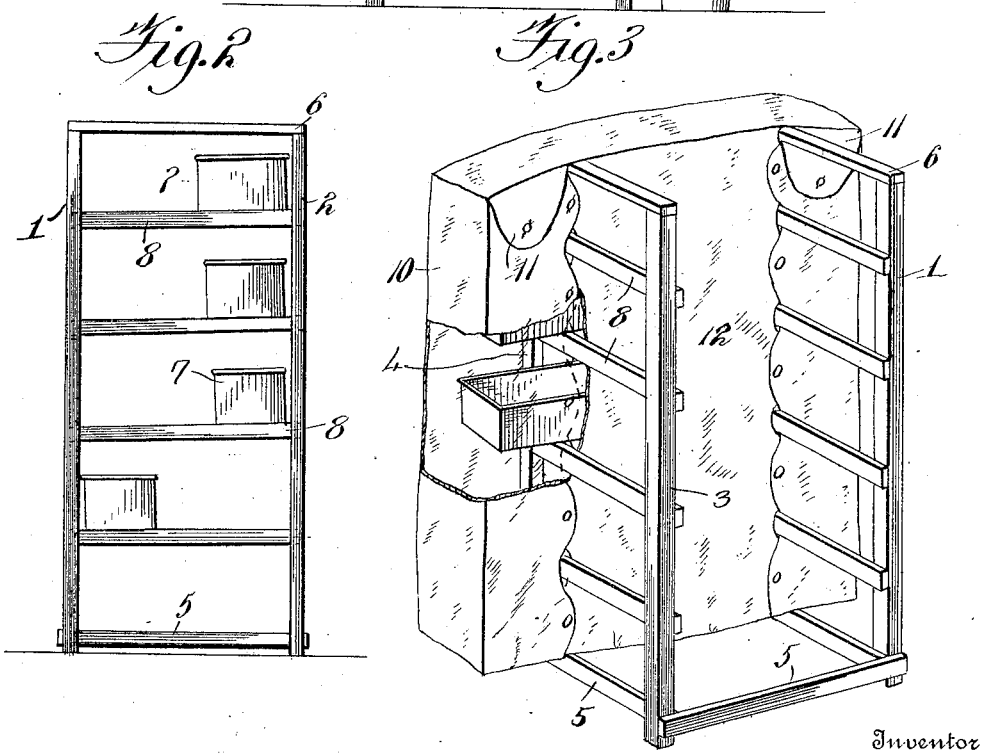

UNITED STATES PATENT OFFICE.

HENRY S. CHAPIN, OF BOWLING GREEN, OHIO.

GRAIN-SPROUTING DEVICE.

1,046,971.

Specification of Letters Patent.  Patented Dec. 10, 1912.

Application filed April 5, 1912.  Serial No. 688,693.

*To all whom it may concern:*

Be it known that I, HENRY S. CHAPIN, a citizen of the United States, residing at Bowling Green, in the county of Wood and State of Ohio, have invented new and useful Improvements in Grain-Sprouting Devices, of which the following is a specification.

This invention relates to racks for holding grain sprouting pans and more particularly to grain sprouting devices.

The sprouting of grain (oats, etc.) for poultry feeding has received considerable attention on account of the fact that it greatly increases the amount of feed from a given amount of grain and adds much to its value. This sprouting has usually been accomplished by placing the grain in pails, boxes, or other such receptacles and is attended by several inconveniences, loss of time, and unnecessary labor.

It is the object of this invention to avoid these difficulties and also to prevent the grain from rotting in the pans by reason of constant water in the pans.

The invention also contemplates a cover for the pans which will hold heat.

A further object of the invention is the construction of a rack having a plurality of bins or pans so supported thereon that the drippings from each bin travels in a common line and will drop to a single receptacle, thus preventing any dripping upon the floor or other surface where the device is supported.

Further objects of this invention will appear as the following specific description is read in connection with the accompanying drawing, which forms a part of this application, and in which:—

Figure 1 is a front elevation. Fig. 2 is a side elevation showing the lower pan pulled out for convenience in raking or sprinkling the grain. Fig. 3 is a perspective view showing a special cover mounted over the pans for retaining the heat therein.

In the specific embodiment of the invention, as illustrated herein, the rack is shown as comprising four uprights 1, 2, 3 and 4, all of which are connected together at their lower ends by the bars 5 and the uprights 1, 2, and 3, 4 are connected by a cross piece 6 at their upper ends. The grain sprouting pans which are shown at 7 are supported upon pairs of cross rods 8, the said cross bars having a slight downward inclination from the uprights 2 and 4 to the uprights 1 and 3 and the cross bars which connect the uprights 1 and 2 are arranged in a lower plane than the corresponding bars upon the opposite side of the rack. Both bars of each pair have substantially the same inclination from the rear to the front of the rack. Each pan is provided with a drip opening 9 in its forward right hand corner so that when all of the pans are alined, as shown in Fig. 1, the upper pan will drip past the next succeeding lower pan and so on, into any suitable receptacle placed upon the floor, or other surface upon which the rack is supported. These pans are preferably constructed of varying sizes, the lower one being the smaller and the upper ones gradually increasing in size so that they may be properly nested one into the other for transportation or storage. In order to retain heat within the pans, any suitable cover, such as a blanket or other like device, may be thrown over the rack so as to cover all the pans or the special type of cover, as illustrated in Fig. 3, may be employed. This cover consists of a back 10 having attached thereto top flaps 11 which are adapted to overhang the inwardly turned ends of the back and being also provided with a flap 12 which goes in between the uprights of the frame and is thus arranged close to the pans.

In treating the grain in the pan, the same is first soaked possibly half a day or during the night and the bulk of the water is then drained off. The grain is then poured into the pans and covered to permit warmth. It is then sprinkled with warm water and stirred once or twice a day.

The order in which the pans are arranged may be reversed and so that the upper pan will be smaller and will drip into the next succeeding lower pan, and the last or lowest pan will drip directly into the receptacle.

What is claimed is:—

1. A grain sprouting device comprising a plurality of pans, and a rack for supporting the pans with an inclination both laterally and longitudinally, said pans having apertures in their lowest corners.

2. A grain sprouting device comprising a plurality of uprights, inclined cross bars connecting said uprights, and a plurality of pans slidably mounted upon said cross bars.

3. A grain sprouting device comprising four uprights, cross bars connecting said uprights and being inclined, cross bars upon one side of the device lying in a plane lower than the cross bars of the opposite side of the rack, pans slidably mounted upon said cross bars and having apertures in their lowest corners, and means to cover said pans.

In testimony whereof I affix my signature in presence of two witnesses.

HENRY S. CHAPIN.

Witnesses:
ROBERT DUNN,
J. H. WALLAM.

Copies of this patent may be obtained for five cents each, by addressing the "Commissioner of Patents, Washington, D. C."